United States Patent [19]

Bone

[11] 4,353,932
[45] Oct. 12, 1982

[54] REFRIGERATOR POURABLE AND STABLE PANCAKE BATTERS FOR PREPARING STABLE PANCAKES AND METHOD FOR PREPARING

[75] Inventor: David P. Bone, Palatine, Ill.

[73] Assignee: The Quaker Oats Company, Chicago, Ill.

[21] Appl. No.: 233,364

[22] Filed: Feb. 11, 1981

[51] Int. Cl.³ ............................................. A21D 10/04
[52] U.S. Cl. ..................................... 426/532; 426/553
[58] Field of Search .............................. 426/552–553, 426/326, 335, 541, 128, 532

[56] References Cited

U.S. PATENT DOCUMENTS 3,620,763 11/1971 Hans ...................................... 426/552
3,753,734 8/1973 Kaplow ............................... 426/553
4,146,652 3/1979 Kahn ..................................... 426/564

*Primary Examiner*—Raymond N. Jones
*Assistant Examiner*—Elizabeth A. Hatcher
*Attorney, Agent, or Firm*—Gerald T. Shekleton

[57] ABSTRACT

Microbiologically stable intermediate moisture batters for preparing microbiologically stable pancakes, both of which can be maintained at refrigerator temperature for extended periods of time are disclosed. The batters contain relatively high levels of shortening and total sugar content in a ratio to water of 0.3–0.6:1.0. Such a relatively low total sugar content allows flour content and other ingredients to approximate the levels found in homemade batters, while the water activity of the batter is kept below 0.95 for a refrigerator stable product, and the water activity of the resulting pancake is below 0.88.

2 Claims, No Drawings

REFRIGERATOR POURABLE AND STABLE PANCAKE BATTERS FOR PREPARING STABLE PANCAKES AND METHOD FOR PREPARING

This application relates to food products in general, and more specifically to refrigerator stable pancake batters for preparing stable pancakes at room or refrigerator temperatures.

Food products, such as pancakes, have traditionally required the mixing of their constituent ingredients immediately prior to cooking. A formulated batter prepared in this manner possessed a limited shelf life, even under refrigeration, mostly due to the microbiological deterioration and/or inherent physical instability of the product. As a result, in order to better avoid waste, the consumer was required to accurately estimate the amount of batter to be mixed for preparing the correct number of pancakes. Not only could an underestimation prove embarrassing to a host consumer, but it became difficult to prepare small portion servings, if desired.

In recent years a new technology has emerged in the food industry utilizing the concept of an intermediate moisture food product for extending shelf life. As is known, high levels of moisture in a food generally promote the microbiological spoiling and growth of organisms such as yeast, molds and bacteria. Stabilization of food products has traditionally been effected through the use of inherent properties of food, such as the naturally high acid content that occurs in tomato sauces and the like; sterilization of the food followed by hermetic sealing; drying the food to under 10 percent moisture; or freezing the food product. Each of the above methods of preserving foods has drawbacks. For instance, a high acid content approach may only be utilized with certain foods. Hermetically sealing and sterilizing foods becomes relatively expensive and can destroy the flavor of some foods. Frozen foods must be defrosted prior to use and may not be refrozen.

The intermediate moisture foods recently introduced rely on the reduction of the availability of water in the food to reduce microbial growth and lengthen shelf life. Such availability of water in the food is commonly termed "water activity" ($A_w$). In general, a low $A_w$ of the food product (unter 0.90) indicates the existence of an environment in which most bacteria will not generally grow. Under refrigerated conditions, such as 5° C., the maximum $A_w$ inhibitory to most bacteria is 0.95.

The $A_w$ of the food, or the partial vapor pressure of the water at the temperature of the food, can be experimentally determined by placing the sample in a sealed container and, upon reaching equilibrium, determining the relative humidity in the head space above the sample.

The principle of extending the shelf life of a food product by lowering the water activity of that food product was first demonstrated in U.S. Pat. No. 3,202,514 to Burgess et al., which disclosed a pet food having a moisture content between 15-30 percent, with water soluble solids, principally sugar, between 15-35 percent by weight. Pet food prepared according to this patent was capable of being stored in conventional moisture protective wrapping materials and eliminated the necessity for hot packing or thermal sterilization incident to packaging. With such a composition and packaging, the pet food could be stored for extended periods of times under non-refrigerated conditions without incurring any significant risk of microbiological spoilage, of recontamination or of product discoloration.

More recently, a class of intermediate moisture foods has been taught by U.S. Pat. No. 4,146,652 to Kahn et al. for a variety of food products, including pancake batters. The pancake batter taught by Kahn comprised about 15-45 percent water with sugar in a ratio to water of about 1-2:1, about 2.5-10 percent fat, as well as other conventional additives. Kahn teaches that the fructose and dextrose sugar content of the pancake batter must be at least 50 percent of the total sugar content. The pancake batter thus produced was flowable at 20° F. having a water activity under 0.90, a total sugar content of 34 percent, a 6.0 molal concentration of solutes in the moisture phase, with a sweet, almost medicinal flavor. In use the pancakes formed by pouring the batter straight from a refrigerated condition stuck to the griddle, were dense, soggy and easily scorched.

SUMMARY OF THE INVENTION

Therefore an object of the subject invention is a pancake batter mix in which control of the water activity of the batter makes possible microbiological stability of the batter for extended periods of time, and is capable of forming stable pancakes as well.

Yet another object of the subject invention is a pancake batter which may be stored at freezer and refrigerator temperatures for extended periods of time and yet be capable of preparing stable pancakes having a high degree of palatability, good texture and good cooking capabilities.

It is a further object of the subject invention to provide superior quality shelf stable pancake batters and pancakes having water activities under 0.95 wherein the content of water soluble solids is substantially less than the content of moisture in the batters.

It is still a further object of the subject invention to provide superior quality refrigerator stable pancake batters in which the weight percent of edible polyhydric alcohols is less than 15 percent of the total batter weight.

It is still a further object of the subject invention to provide superior quality shelf stable pancake batters containing less than 15 percent sugars by weight, with a sugar to water ratio of about 0.3-0.6:1.0, such batters being capable of forming stable pancakes.

Further objects are attained in accordance with the present invention wherein is provided a superior quality shelf stable pancake batter which is spoonable or pourable at refrigerator temperatures. The batter has a water activity less than 0.925 and a neutral pH. Such a pancake batter is formulated by preparing a mixture of wheat and/or corn flour, egg, starch, edible oils, sugars and other polyhydric alcohols, an anti-mycotic agent and a leavening system. The pancake formed by cooking the batter of the subject invention is also stable, being capable of being stored for weeks without substantial deterioration in flavor or texture.

More specifically, the batter of the subject invention is substantially similar to conventional batter recipes containing 35-40 percent by weight moisture and sugar in a sugar to water ratio of 0.3-0.6:1.0, and a maximum of 14-20 percent total sugars including saccharides and polyhydric alcohols. Such a low percentage of total sugar content, yet lowered $A_w$, is made possible by the high (10-15 percent) vegetable oil content, which, through thorough mechanical homogenization, provides sufficient solutes in suspension in the batter mix to achieve a lowering of the water activity for improving microbiological stability at refrigerated temperatures, such as, say −15° C. The $A_w$ value of batter mixtures formulated in the above manner may range from 0.88 to 0.95. The pancakes formed from the batter, if well cooked, ranges from 0.88 on down. The batter texture is stirrable to spoonable at 10° F. and has substantial resistance to bacterial decomposition.

The novel features of the invention both as to the product and the method of making the product together with further objectives and advantages thereof will be better understood from the following description in which the presently preferred method and composition of the invention is set forth.

DETAILED DESCRIPTION OF THE INVENTION

In the pancake batter of the subject invention the total sugar level is dramatically decreased, making it possible to improve the organoleptic qualities of the resulting pancake made from the batter. The pancake batter formulation of the subject invention more closely resembles a standard or "homemade" pancake batter containing wheat, corn, or other flour as well as other accepted ingredients, as will be shown.

In addition, it has been found that the high sugar level, in particular the high saccharide level of prior art pancake batters such as those of Kahn et al., U.S. Pat. No. 4,146,652 promoted sticking to the hot griddle and scorching even when the griddle was well-greased. Therefore, by reducing the total sugar level, the tendency to stick and scorch have been substantially reduced. By reducing the sugar level, flavor and texture of the pancake have also been enhanced. Additionally, reduction of the sugar level has resulted in reduction of the sweetness level of the batter to an acceptable level. For purposes of the subject invention, the term sugar or, total sugar content, shall mean all saccharides, and their degradation products, and including polyhydric alcohols, particularly those of low molecular weight to increase the solute concentration of the mixture, as reflected in a lower $A_w$.

To obtain the necessary microbiological stability and refrigerated pouring attributes of the mix, polyhydric alcohols such as glycerol and sorbital have been introduced into the batter. Such polyhydric alcohols are as stated above preferably of low molecular weight so as to offer a substantial effect in decreasing the water activity of the batter.

The moisture content of the batter of the subject invention will typically be from about 30 percent to about 40 percent. A water content substantially above this preferred range reduces the shelf life due to a reduction of solute concentration and thus the bacteriostatic effect of the solids dissolved in the batter's water phase, while a lower moisture content reduces the palatability and texture of the batter. If necessary some or all of the desired total water content of the matter may be provided by the addition of water. As discussed above molalities from 2-5 are observed in the batters of the subject invention having the preferred $A_w$s of 0.88-0.95. The resulting pancakes, if well cooked, have $A_w$s beneath 0.88. A batter containing an ideal solution phase would require a solute concentration of 4.5 molal in order to have a water activity of 0.925. Using sucrose as a sole non-ideal solute, a concentration of 3.3 molal is required. However by the solution phase of the batter of the subject invention, an $A_w$ of 0.925 can be obtained with a molality of only 2.35. In order to decrease the total water level and yet retain the molality values required for an acceptable $A_w$, relatively high (10–15 percent) levels of vegetable oil shortening are used. Such high levels of shortening reduce the water requirements and permit acceptable, stable pancakes to be made, with 35–40 percent moisture. A soluble heat-setting protein, such as egg albumen, and starches, such as potato starch may be added to improve texture by strengthening the resulting pancake, providing a light, airy structure. Other heat-setting proteins, such as soy protein, vital wheat gluten and peanut protein may be used.

High levels of shortening oils and low moisture levels require homogenization of the pancake batter to form a stable emulsion over an extended storage period. Mechanical homogenization has been found superior to the use of chemical surfactants and the like as better texturization is provided. Therefore in the preferred batters of the subject invention, the batter is processed in a single-stage Gaullin homogenizer which pumps the batter through a small aperture at high pressure to thoroughly homogenize the batter. Similarly effective mechanical homogenization methods and apparatus may be used.

For convenience in use the homogenized batter should remain pourable or spoonable at temperatures at or below the melting point of the batter. An important factor in the rheological or flow properties of the batter is the ratio of non-freezable to freezable water in the batter. This ratio affords an insight into both the amount of water bound up by its environment in the batter so that it cannot turn into ice crystals, and the amount that is not so bound. Preferred ratios, i.e., those that reflect batters being pourable or spoonable at the normal freezer temperatures of around −15° C., are greater than 0.2:1 and most preferably equal to or greater than 0.3:1.0.

Non-freezable to freezable water ratios can be determined by calculating the area of an endotherm obtained by melting a known weight of ice through use of a Differential Scanning Calorimeter (DSC). The DSC endotherm from melting the ice in a batter sample is then obtained. The ratio of these two endotherms is used to calculate the weight of freezable water in the batter. The weight of non-freezable water is obtained by subtracting the weight of freezable water from the total weight of water in the batter. These figures are then used to determine the non-freezable:freezable water ratio.

Additional ingredients in the batter will include desired flavorings: salt; nutrients, including vitamins, minerals, etc. Antioxidants and leavening agents may be used in minor amounts as known in the art.

The batter of the subject invention may also have an antimycotic agent in sufficient levels to prevent the growth of organisms such as yeast and molds. Such antimycotic agents may be sorbic salts, such as potassium sorbate as well as sorbic acid, propylene glycol, alone or with other humectants such as sorbitol and other antimycotic agents as apparent to those skilled in the art. These antimycotic agents will be used in amounts that are effective to prevent the growth of yeast and molds, such as 0.1 percent or higher, depending on the particular antimycotic and the particular product composition.

In the following examples specific preferred embodiments in accordance with the present invention will be disclosed and compared in terms of organoleptic qualities and stability with both a standard non-refrigeratable recipe and a refrigerable recipe. All percentages expressed in the following examples are in percent by weight based on the weight of the material or mixture then referred to.

EXAMPLE I

The following formulation represents a standard and accepted pancake batter recipe. The flavor, texture and strength of pancakes made from the batter were good. Refrigerator stability was observed to be poor, with flavor and texture of the pancakes made from the batter deteriorating rapidly.

| | |
|---|---|
| Whole Fresh Egg | 13.3 |
| Buttermilk solid | 3.1 |
| Milk | 50.3 |
| Wheat Flour | 25.8 |
| Baking Powder | .9 |
| Sucrose | 6.3 |
| Salt | .3 |
| | 100.0 |

The moisture content of Example I's homemade batter was approximately 57 percent with 8.9 percent sugar and a sweetness level equal to approximately 7.3 percent sucrose. Molality was 0.7.

EXAMPLE II

| | |
|---|---|
| Wheat Flour | 30.7 |
| Sucrose | 5.0 |
| Non Fat Dry Milk | 2.5 |
| Dextrose | 2.3 |
| Salt | .9 |
| Sodium Aluminum Phosphate | .8 |
| Sodium Bicarbonate | .8 |
| Shortening | 2.0 |
| Whole Egg | 8.0 |
| Water | 47.0 |
| | 100.0 |

The above ingredients are mixed to provide a batter which was storable in the frozen state, being thawed prior to use. The batter had somewhat limited refrigerated shelf life after thawing, having an $A_w$ of 0.97 with no non-freezable moisture content, and a molality of 0.9. At $-16°$ C. the batter was frozen hard, freezing at about $-3°$ C. Flavor and texture of the pancakes were judged good with the freshly thawed batter. The pancakes were not stable.

EXAMPLE III

| | |
|---|---|
| Wheat Flour | 19.0 |
| Corn Flour | 7.0 |
| Potato Starch | 5.0 |
| Water | 36.3 |
| Dried Whole Egg | 1.0 |
| Vegetable Oil | 13.0 |
| Glycerine | 2.5 |
| Sucrose | 7.5 |
| Lactose | 2.0 |
| Dextrose | 2.0 |
| Dried Whey | 1.0 |
| Salt | 1.0 |
| Sodium Bicarbonate | 0.8 |
| Sodium Aluminum Phosphate | 0.8 |
| Egg Albumen | 1.0 |
| Methyl Paraben | 0.05 |
| Propyl Paraben | .02 |
| Antioxidant Preparation | 0.3 |
| | 100.00 |

All of the above ingredients, with the exception of $NaHCO_3$ are charged into a Hobart Model 120 mixer equipped with a wire ship stirrer and mixed to form a substantially homogeneous batter. The pH of the mix was adjusted to neutral with 10 percent NaOH solution, after which the $NaHCO_3$ was mixed in. The batter was then placed into a stable emulsion form by passing it through a single stage Gaullin homogenizer, at high pressure.

The resulting batter was microbiologically stable at refrigerator temperatures for extended periods of time, and had a moisture phase solute concentration of 2.35 molal with an $A_w$ of 0.93 and a pH of 6.87. The flour level of 26 percent approximates the levels of conventional batters. The moisture level of the batter of Example III had a non-freezable to freezable water ratio of 0.3:1.0, thereby giving the batter pourable characteristics at $-7°$ to $-10°$ C. The pancakes made from the batter of Example II had an $A_w$ of 0.88, were fluffy and light, good tasting with good appearance. These pancakes browned evenly and did not stick to the griddle. The pancakes were stable for 2–3 weeks, tasting good with acceptable texture after such time.

EXAMPLE IV

| | |
|---|---|
| Wheat Flour | 30.00 |
| Water | 25.00 |
| Fresh Whole Egg | 10.00 |
| Vegetable Oil | 10.14 |
| Glycerine | 10.20 |
| Sucrose | 6.00 |
| Sorbitol 70% Solution | 4.68 |
| Dried Whey | 1.00 |
| Salt | 1.00 |
| Sodium Bicarbonate | 0.80 |
| Sodium Aluminum Phosphate | 0.80 |
| Dried Egg Albumen | 0.30 |
| Parabens | 0.07 |
| Antioxidant Preparation | 0.01 |
| | 100.0 |

A pancake batter was prepared with the above ingredients using the method of Example III. The batter thus prepared was microbiologically stable at refrigerator temperatures over extended periods of time, and had a moisture phase solute concentration of 4.5 molal, with an $A_w$ of 0.88. The flour level of 30 percent is equivalent to that of standard homemade batters. The ratio of non-freezable to freezable water was 0.82:1.0, total moisture was 37 percent and the pH was 7.1. The batter was spoonable at about $-20°$ C. and pourable at about $-10°$ C. The pancakes made from the batter had an $A_w$ of 0.85, were fluffy and light, good tasting with good appearance. These pancakes browned evenly and did not stick to the griddle. Good stability of the pancakes at room temperature for 2–3 weeks was observed.

In cooking the batter of the subject invention it is important to cook the pancakes sufficiently to achieve the desired stability. For instance, 2 minutes on one side and 1 minute on the opposite side at 375° F. should be sufficient for a well-cooked pancake.

Both of Examples III and IV had a flour content approximating that of Examples I and II, with minimal total sugar, thereby providing a batter formulation substantially close to traditional and accepted recipes. The level of shortening or oil however, has been increased in the batters of the subject invention to between 10–15 percent, such relatively high levels of shortening in combination with the relatively low levels of moisture and high solute levels provide a sufficiently low water activity (<0.95) to provide microbiological stability over extended refrigerated storage times.

The breadth of the subject invention is illustrated by Examples III and IV. Example III contains a relatively high saccharide level (11.5 Percent) and a relatively low polyhydric alcohol level (2.5 Percent), yet had a solute level and thus molality sufficiently high (2.35) to depress the water activity of 0.93 and thus give the batter microbiological stability, yet maintain its good taste characteristics. Example IV shows a batter with relatively high polyhydric alcohol levels (13.5 Percent) with relatively low saccharide levels (about 7 Percent). With a molality of 4.5 and an $A_w$ of 0.88, microbiological stability of the refrigerated batter and the taste qualities of the resulting pancakes were good. Pancakes prepared from the mixes of both Examples III and IV were observed to be stable at room temperature.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims.

I claim:

1. A pancake batter capable of retaining microbiological stability at refrigerator temperatures for an extended period of time, said batter including:
   a. at least 25% flour;
   b. about 35% to about 40% water;
   c. about 10% to about 15% oil;
   d. sugars comprising saccharides and polyhydric alcohols, said sugars being in ratios to said water of from 0.3/1.0 to 0.6/1.0;
   e. said saccharides being from about 6% to about 11.5%;
   f. said polyhydric alcohols being from about 2.5% to about 13.5%;
   g. a heat-setting protein; and
   h. minor but effective amounts of a leavening agent, an antioxidant, salt and flavoring; said batter being mechanically homogenized to provide a stable emulsion having a water phase solute concentration of about 2 to about 5 molal, a water activity of from about 0.88 to about 0.95 and a substantially neutral pH, said batter being capable of forming pancake of good flavor, texture and appearance.

2. The pancake batter of claim 1 wherein the pancakes formed thereby are microbiologically stable.

* * * * *